United States Patent
Ando et al.

(10) Patent No.: US 6,809,306 B2
(45) Date of Patent: Oct. 26, 2004

(54) SCANNING UNIT AND SCANNING MICROSCOPE HAVING THE SAME

(75) Inventors: Toshio Ando, 2-12, Nagasakadai, Kanazawa-shi, Ishikawa-ken (JP); Akitoshi Toda, Kunitachi (JP)

(73) Assignees: Olympus Optical Co., Ltd., Tokyo (JP); Toshio Ando, Kanazawa (JP)

( * ) Notice: Subject to any disclaimer, the term of this patent is extended or adjusted under 35 U.S.C. 154(b) by 0 days.

(21) Appl. No.: 10/616,879

(22) Filed: Jul. 10, 2003

(65) Prior Publication Data

US 2004/0065819 A1 Apr. 8, 2004

Related U.S. Application Data

(62) Division of application No. 09/803,448, filed on Mar. 9, 2001, now Pat. No. 6,617,761.

(30) Foreign Application Priority Data

Mar. 14, 2000 (JP) ......................................... 2000-071128
Feb. 9, 2001 (JP) ......................................... 2001-034391

(51) Int. Cl.[7] ........................ G02B 27/40; G01N 23/00; B23Q 17/09; G01B 5/28
(52) U.S. Cl. ...................... 250/201.3; 250/306; 73/104; 73/105
(58) Field of Search ........................ 250/234, 306–311, 250/201.3; 73/104, 105; 310/323.02, 328, 330, 331, 332

(56) References Cited

U.S. PATENT DOCUMENTS

| | | | |
|---|---|---|---|
| 4,798,989 A | * | 1/1989 | Miyazaki et al. ............ 310/328 |
| 5,416,375 A | | 5/1995 | Funakubo et al. |
| 5,438,206 A | * | 8/1995 | Yokoyama et al. ..... 250/442.11 |
| 5,486,733 A | | 1/1996 | Yamazaki et al. |
| 5,656,769 A | * | 8/1997 | Nakano et al. ................ 73/105 |
| 5,714,833 A | | 2/1998 | Zumeris |
| 5,912,461 A | | 6/1999 | Ando et al. |
| 5,965,881 A | * | 10/1999 | Morimoto et al. ........... 250/234 |
| 6,118,121 A | | 9/2000 | Ando et al. |
| 6,218,769 B1 | | 4/2001 | Iino et al. |
| 6,323,483 B1 | | 11/2001 | Cleveland et al. |
| 6,590,208 B2 | * | 7/2003 | Massie ........................ 250/306 |

FOREIGN PATENT DOCUMENTS

JP    11-126110    5/1999

* cited by examiner

*Primary Examiner*—David Porta
*Assistant Examiner*—David C. Meyer
(74) *Attorney, Agent, or Firm*—Frishauf, Holtz, Goodman & Chick, P.C.

(57) ABSTRACT

A scanning unit for moving an object to be moved along at least one axis, which comprises a first actuator for moving the object along a first axis, the first actuator having a pair of end portions, and the object being attached to one of the end portions, the first actuator being held at a position in the vicinity of the center in dimension or the center of gravity thereof.

3 Claims, 8 Drawing Sheets

SCANNING UNIT AND SCANNING MICROSCOPE HAVING THE SAME

This is a Division of application Ser. No. 09/803,448, filed Mar. 9, 2001 now U.S. Pat. No. 6,617,761.

CROSS-REFERENCE TO RELATED APPLICATIONS

This application is based upon and claims the benefit of priority from the prior Japanese Patent Applications No. 2000-71128, filed Mar. 14, 2000; and No. 2001-34391, filed Feb. 9, 2001, the entire contents of both of which are incorporated herein by reference.

BACKGROUND OF THE INVENTION

The present invention relates to a scanning microscope or a scanning unit to which a technique of a scanning microscope is applied and which is used in an apparatus for observing or processing a sample or for recording information. More particularly, the present invention relates to a scanning microscope using this scanning unit.

A stage mechanism for causing translational movement or rotational movement of an object is one of the basic elements of a machine mechanism. Further, an automatic stage capable of controlling stage movement by using a drive mechanism such as a motor in accordance with a control signal such as an electrical signal is used in every scene.

A machine mechanism for repeatedly causing reciprocating translational movement or forward or backward rotational movement of an object in a relatively short period of time is also referred to as a scanning unit. Here, such a machine mechanism will be simply referred to as a scanning unit unless otherwise specified.

Such a scanning unit is mounted in, for example, a scanning microscope. As a scanning microscope apparatus in which such a scanning unit is mounted, there are a scanning probe microscope, a later scanning microscope, or an electronic scanning microscope which is of a type capable of obtaining an image by scanning a sample with an electronic beam being fixed.

A scanning probe microscope (SPM) is a scanning microscope which mechanically scans a mechanical probe to obtain information of a sample surface, and includes a scanning tunneling microscope (STM), an atom force microscope (AFM), a scanning magnetic force microscope (MFM), a scanning electric capacity microscope (ScaM), a scanning near-field optical microscope (SNOM), a scanning thermal microscope (SThM) and others. In recent years, a nano-indentator and the like, which makes an indentation by pressing a probe made of diamond against a sample surface and checks hardness and the like of the sample by analyzing how the indentation is made, is regarded as one of the SPMs widely used, together with the above-described various microscopes.

The scanning probe microscope can obtain surface information in a desired sample area through a mechanical probe while performing relative raster scanning or XY scanning with respect to the mechanical probe and the sample, thereby mapping the obtained information on a TV monitor. Further, an SNOM and the like can perform fine processing or optical information recording by causing a light beam emitted from an end of a mechanical probe to act on a workpiece. Furthermore, a nano-indentator can form irregularities on a sample surface to similarly perform fine processing or information recording.

In such a scanning probe microscope, a relative position along the Z axis of the sample and the probe, i.e., a distance between the sample and the probe is subjected to feedback control in such a manner that the interaction of the sample and the probe becomes constant during XY scanning. The movement along the Z axis is different from regular movement along the X axis and the Y axis but irregular in order to reflect the surface shape or surface state of the sample. The movement along the Z axis is generally referred to as Z scanning. The Z scanning has a highest frequency among those of XYZ scanning. A frequency of X scanning by the scanning probe microscope ranges from approximately 0.05 to 200 Hz, and a frequency of Y scanning corresponds to (the frequency of X scanning)/(Y scanning lines). A number of Y scanning lines is 10 to 1000. Furthermore, a frequency of Z scanning is approximately several-fold to 100-fold of pixels per one line of X scanning with respect to a frequency of X scanning.

For example, in order to fetch an image having 100 pixels along the X axis and 100 pixels along the Y axis in one second, a frequency of X scanning is 100 Hz; a frequency of Y scanning, 1 Hz; and a frequency of Z scanning is not less than 10 kHz. It is to be noted that a scanning frequency of this example is presently the highest scanning frequency for the scanning probe microscope, and the frequency of X scanning is usually approximately several Hz. The scanning unit must be stable against external vibrations, and vibrations generated from the scanning unit itself by the internal scanning operation must be suppressed in order to realize such a high scanning frequency as in this example.

The scanning unit is driven by vibrating a support portion supporting the scanning unit as a counteraction. The vibration of the support portion again acts on the scanning unit to vibrate an object. Therefore, the scanning unit requiring accurate positional control for the object must suppress the generation of such vibrations as much as possible. Although one effective method for suppressing the occurrence of vibrations is to slowly move the object, this goes against the necessity for repeatedly moving the object in a short period of time required in the scanning unit.

BRIEF SUMMARY OF THE INVENTION

A main object of the present invention is to provide a scanning unit capable of suppressing generation of vibrations and thereby effecting accurate positional control.

Another object of the present invention is to provide a scanning microscope using such a scanning unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

First Embodiment

Figure 1:
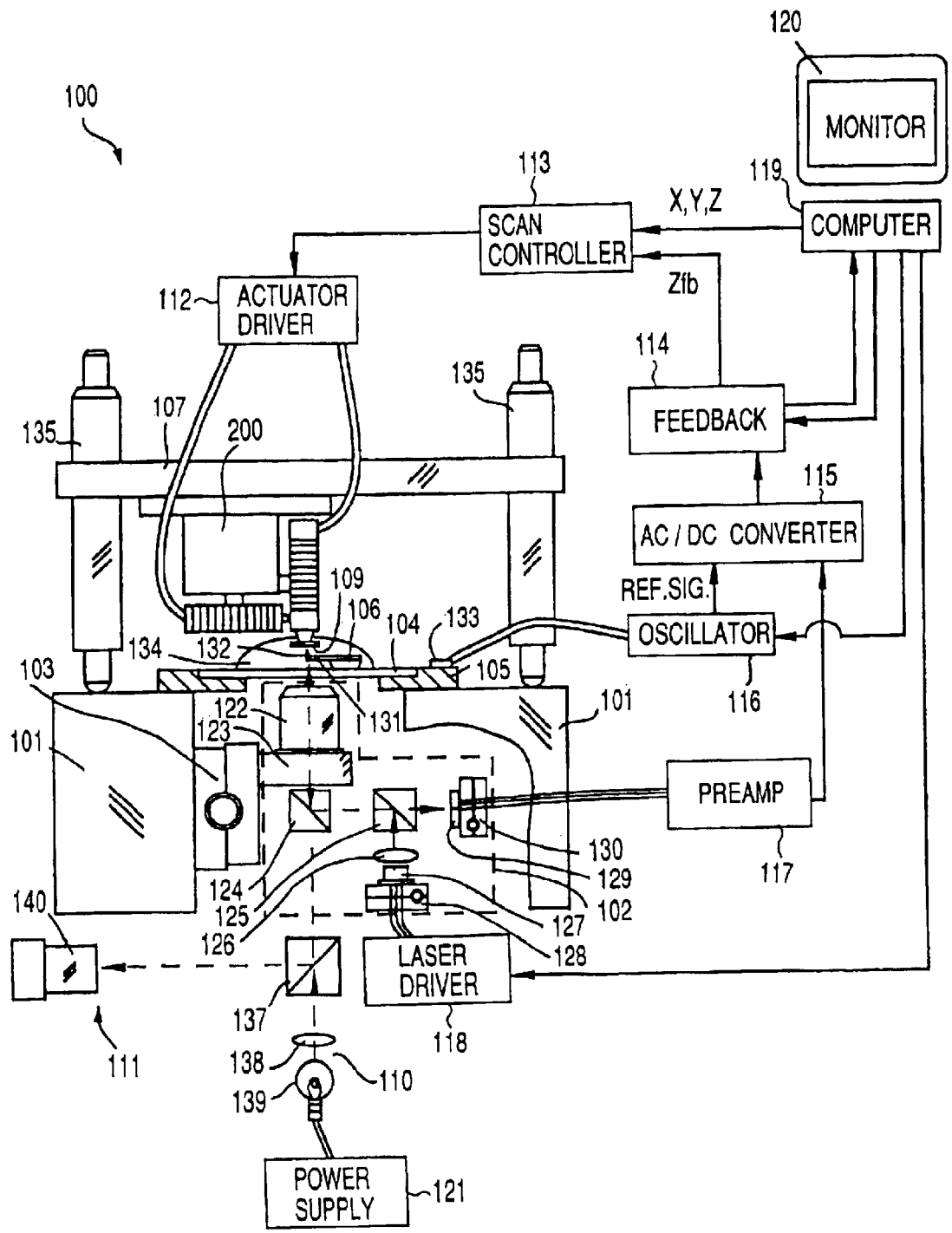
FIG. 1 shows a scanning probe microscope having a scanning unit according to a first embodiment.
Figure 2A:
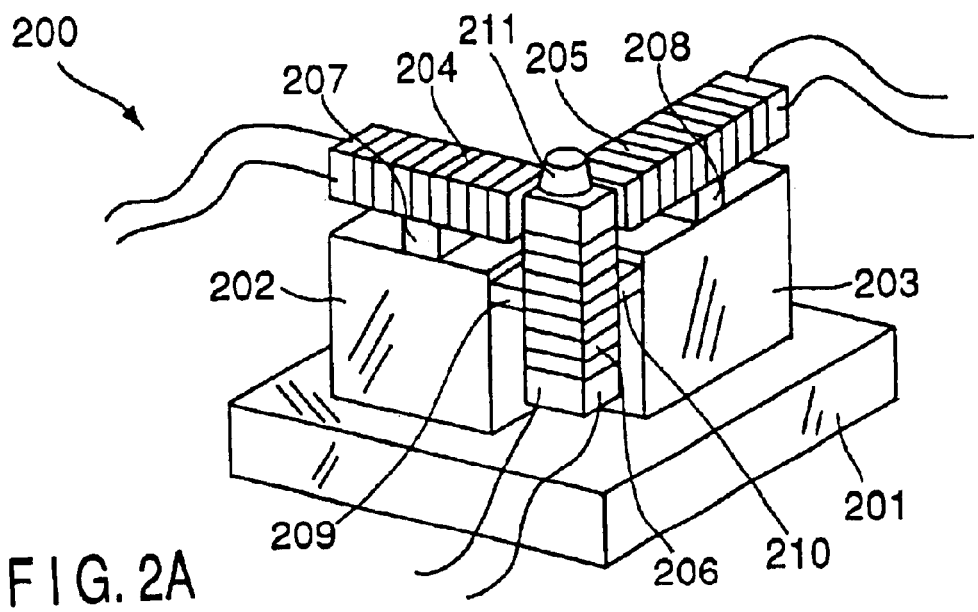
FIG. 2A is a perspective view of a scanning unit illustrated in FIG. 1, which shows the scanning unit upside down for easy understanding.
Figure 2B:
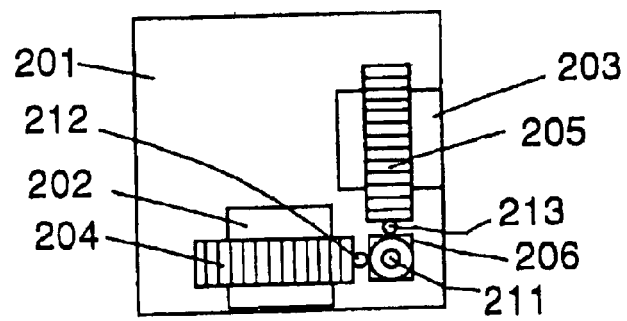
FIG. 2B is a side view of the scanning unit shown from a Z direction.
Figures 2C, 2D:
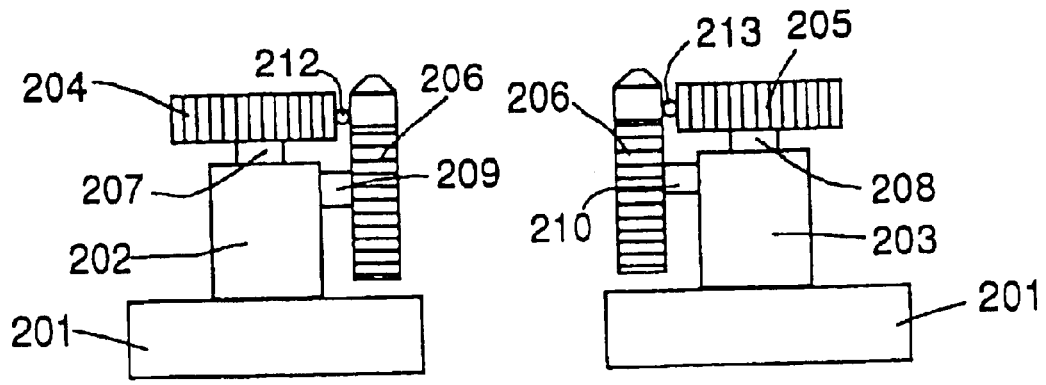
FIG. 2C is a side view of the scanning unit shown from a Y direction.
FIG. 2D is a side view of the scanning unit shown from an X direction.

FIG. 1 shows a mechanical scanning microscope, i.e., a scanning probe microscope having a scanning unit of a first embodiment according to the present invention.

In FIG. 1, a scanning probe microscope 100 basically has a part corresponding to a scanning probe microscope function and a part corresponding to an optical microscope function.

The part corresponding to the scanning probe microscope function includes: a case 101; an optical sensor unit 102; a sensor unit Z stage 103; a slide glass 104; a slide glass holding portion 105; a cantilever chip 106; a scanning unit holding base 107; a scanning unit 200; an actuator drive circuit 112; a scanning control circuit 113; a feedback circuit 114; an AC/DC conversion circuit 115; an oscillation circuit 116; a pre-amp circuit 117; a semiconductor laser drive circuit 118; a computer 119; and a TV monitor 120.

Further, the part corresponding to the optical microscope function includes: an optical illuminating system for microscope observation 110 including a light source lamp 139 and a lens 138; an optical observation system for microscope observation 111 including an eyepiece 140; a half prism 137; a microscope illuminating lamp power supply 121; and an objective 122 of the optical sensor unit 102 shared with the part corresponding to the scanning probe microscope function.

Further description will be given as to the part of the scanning probe microscope function. The scanning unit holding base 107 is supported at three points on the case 101 by three micrometer heads 135 (only two micrometer heads are shown in FIG. 1) which can be manually fed by a small amount. Furthermore, the scanning unit 200 is supported on the scanning unit holding base 107, and a sample 109 is attached to the scanning unit 200 in such a manner that the sample 109 faces downwards, namely, it is opposed to the cantilever chip 106 side. The scanning unit 200 applies micromotion scanning to the sample 109 along the X axis, the Y axis and the Z axis. The details of the scanning unit 200 will be fully explained later. The scanning unit 200 may include an adjustment mechanism for effecting rough adjustment of positions of a probe 132 of the cantilever chip 106 and the sample 109 in regard to each of the X axis, the Y axis and the Z axis.

The optical sensor unit 102 measures movement of a cantilever 131 of the cantilever chip 106. This is an optical sensor which is of an optical lever type. The optical sensor unit 102 has: an objective 122; an objective supporting base 123; a prism 124; a polarized beam splitter 125; a collimator lens 126; a semiconductor laser 127; a laser position adjustment stage 128; a two-split photodiode 129; a photodiode position adjustment stage 130.

A light ray emitted from the semiconductor laser 127 is turned into a parallel beam by the collimator lens 126 and then reflected by the polarized beam splitter 125. Thereafter, this light beam is further reflected by the prism 124 and enters the objective 122. The parallel beam is condensed on a rear surface of the cantilever 131 of the cantilever chip 106 by the objective 122. The light beam reflected by the rear surface of the cantilever proceeds in the opposite direction. It passes through the polarized beam splitter 125 and further goes straight to reach the two-split photodiode 129. The angle displacement of the cantilever 131 is reflected on movement of a light spot on the two-split photodiode 129 and outputted as an electric signal.

The objective 122 of the optical sensor unit 102 constitutes the optical illuminating system for microscope observation 110 and the optical observation system for microscope observation 111 as well as the optical system for optical microscope observation. The objective 122 is an objective for use in an optical microscope and has, for example, a twenty-fold magnification.

The sensor unit Z stage 103 is provided for performing rough adjustment of a position of the optical sensor unit 102 including the objective 122. The sensor unit Z stage 103 moves the objective 122 included in the optical sensor unit 102 up and down to effect focusing of the optical sensor or focusing for microscope observation.

The slide glass holding portion 105 holds the slide glass 104. A piezoelectric excitation device 133 for exciting the cantilever 131 is fixed to the slide glass holding portion 105 at a position apart from an attachment portion for the cantilever chip 106. An alternating voltage in the proximity of a resonance frequency of the cantilever 131 is applied to the piezoelectric excitation device 133. The piezoelectric excitation device 133 vibrates in accordance with the application of this voltage, and this vibration is transmitted to the cantilever chip 106 to vibrate the cantilever 131.

In measurement for vibrating the cantilever 131 in this manner, a displacement signal of the cantilever outputted from the optical sensor unit 102 becomes alternated. The AC/DC conversion circuit 115 converts this signal into a direct-current signal. In measurement in which the cantilever 131 is not vibrated, this circuit may be bypassed so that it does not operate.

Moreover, FIG. 1 shows the state of observation in a liquid. Water 134 drips from the vicinity of the sample 109 of the scanning unit 200 to the proximity of the slide glass 104 to which the cantilever chip 106 is fixed. Both the sample 109 and the cantilever chip 106 are positioned in water. In the case of performing measurement in air, the water 134 is not necessary.

As shown in FIG. 1, the scanning probe microscope 100 includes an electric circuit and the like for controlling/driving the apparatus. The operation of these circuits is similar to the circuit operation in the scanning probe microscope which has been conventionally proposed.

A control signal of XYZ scanning is supplied from the computer 119 to the scanning control circuit 113. Reference character "Z" in FIG. 1 denotes a signal for adjusting a distance between a Z scanning actuator of the scanning unit 200 and the probe 132 of the cantilever chip 106. The signal "Z" is mainly outputted from the computer when setting measurement conditions, for example, at the time of force curve measurement before carrying out measurement. In addition, the computer 119 controls the oscillation circuit 116 to operate the piezoelectric excitation device 133 and vibrates the cantilever 131 in the vicinity of the resonance frequency thereof.

When measurement starts, the actuator of the scanning unit 200 is scanned along the X axis and the Y axis based on a raster scanning control signal (designated by "X" and "Y" in the drawing) outputted from the computer 119. The displacement of the cantilever 131 based on the interaction of the probe 132 provided at the end of the cantilever 131 and the surface of the sample 109 is detected by the optical sensor unit 102, and the optical sensor unit 102 outputs the displacement signal. The displacement signal outputted from the optical sensor unit 102 is amplified by the pre-amp circuit 117 and inputted to the AC/DC conversion circuit 115. The AC/DC conversion circuit 115 extracts a signal having a frequency component of a reference signal from the oscillation circuit 116 and converts the alternating signal into a direct-current signal.

The feedback circuit 114 compares a setting signal directed by the computer 119 with an input signal from the AC/DC conversion circuit 115 and transmits a Z feedback signal Zfb to the scanning control circuit 113. The Z feedback signal Zfb serves as a scanning control signal of the Z direction actuator. The scanning control circuit 113 controls the actuator drive circuit 112 based on the Z feedback signal Zfb and drives the Z scanning actuator of the scanning unit 200. The computer 119 processes surface information of the sample as three-dimensional information based on scanning control signals "X" and "Y" generated by the computer 119 itself and a signal from the feedback circuit 114 and displays the result on the TV monitor 120.

The scanning unit 200 of this embodiment will be further described in detail with reference to FIGS. 2A to 2D. As shown in FIGS. 2A to 2D, the scanning unit 200 comprises: a scanning unit holding base 201; actuator pedestals 202 and 203 fixed to the scanning unit holding base 201; and actuators 204, 205 and 206 attached to the actuator pedestals 202 and 203.

The actuator 204 is extendable along, for example, the X axis and is substantially supported by the actuator pedestal 202 through the actuator holding portion 207. Similarly, the actuator 205 is extendable along, for example, the Y axis and substantially supported by the actuator pedestal 203 through the actuator holding portion 208. The actuator 206 is extendable along the Z axis and substantially supported by the actuator pedestals 202 and 203 through the actuator holding portion 209.

Each of the actuators 204, 205 and 206 comprises, for example, a stacked piezoelectric device, and the piezoelectric device has, for example, a length of 10 mm and a cross section of 5 mm×3 mm. It extends and contracts by 3 $\mu$m upon application of a voltage of 100 V. The actuators 204, 205 and 206 extend and contract along the X axis, the Y axis and the Z axis in accordance with application of a drive voltage through two lines extending therefrom, respectively.

The actuator holding portion 207 holds the actuator 204 at a position in the vicinity of the center in dimension or the center of gravity thereof. The actuator holding portion 208 holds the actuator 205 at a position in the vicinity of the center in dimension or the center of gravity thereof. The actuator holding portions 209 and 210 hold the actuator 206 at a position in the vicinity of the center in dimension or of the center of gravity thereof.

To the actuator 206 is attached a sample holding portion 211 for holding an object to be moved, for example, a sample. The sample holding portion 211 has a sample base glass attached on an end surface thereof.

The actuator 204 extendable along the X axis has a minute ball 212 attached on an end surface thereof facing the actuator 206 extendable along the Z axis, and the minute ball 212 abuts and is attached on one end portion side surface of the actuator 206 crossing the X axis. Similarly, the actuator 205 extendable along the Y axis has a minute ball 213 attached on an end surface thereof facing the actuator 206, and the minute ball 213 abuts and is attached on one end portion side surface of the actuator 206 crossing the Y axis.

As described above, according to the scanning unit having the end surfaces of the actuators being in contact with the object through the minute balls, the minute ball provided to the actuator which does not extend and contract serves as a guide with respect to the object and does not obstruct movement of the object by another actuator which extends and contracts. Therefore, this scanning unit has an advantage that the linearity of the operation characteristic is high.

Figure 3A:
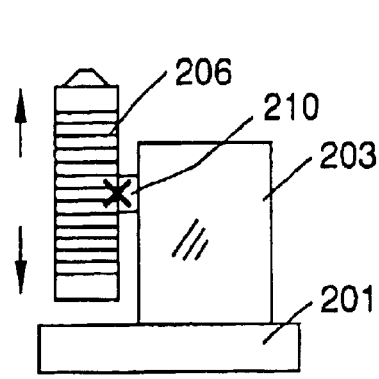
FIG. 3A is a drawing for explaining the operation of the scanning unit illustrated in FIGS. 2A to 2D.

The operation of the scanning unit 200 shown in FIGS. 2A to 2D along the Z axis will now be described with reference to FIG. 3A typically illustrating the scanning unit 200. FIG. 3A shows only members necessary for the following explanation.

In FIG. 3A, the actuator 206 comprises a stacked piezoelectric device, and its part close to the center in dimension or the center of gravity is fixed to the actuator pedestal 203 provided to the scanning unit holding base 201 by an actuator holding portion 210 made of silicone rubber having an adhesive effect. The both side portions of the stacked piezoelectric device 206 extend and contract in opposed directions as shown by the arrows in accordance with application of a voltage with a position in the vicinity of the center in dimension or the center of gravity fixed to the actuator holding portion 210 as a reference.

In general, the operation of the actuator gives the vibrations or impact due to the counteraction of the actuator operation to the actuator holding portion holding this actuator. Such vibrations or impact results in oscillation of the scanning unit. In the case of scanning at high speed or scanning using a high frequency, it is desirable to suppress the vibrations of the scanning unit as much as possible.

In this embodiment, since a position of the actuator 206 in the vicinity of the center in dimension or the center of gravity thereof is supported, the impact is balanced on the boundary face between the actuator 206 and the actuator holding portion 210 indicated by a symbol X in the drawing, and the vibration transmitted to the actuator pedestal 203 or the scanning unit holding base 201 can be suppressed. This can be better understood by comparing with the later-described comparative examples shown in FIGS. 7A, 7B, 8A, 8B, 9A and 9B.

Although the above has described suppression of generation of the vibrations concerning the Z scanning actuator 206, the occurrence of the vibrations can be similarly suppressed with respect to the X scanning actuator 204 and the Y scanning actuator 205.

In the prior art scanning unit, the actuator such as a stacked piezoelectric device described above usually has one end portion being held in order to assure a large scanning range, i.e., a long stroke. Thus, the counteraction of the operation of the actuator affects the holding portion, and this oscillates the scanning unit.

On the contrary, in the scanning unit in which the actuator is held at a position close to the center in dimension or the center of gravity as in this embodiment, since the part of the kinetic system close to the center of gravity is held, oscillation at the holding position can be suppressed. As a result, this scanning unit has less vibrations and stably operates with respect to scanning at high speed.

With the scanning probe microscope illustrated in FIG. 1, a sample (a latex ball having a diameter of 150 nm) in a liquid was able to be measured at an image fetching speed that an observation range on the sample surface 0.5 $\mu$m×0.5 $\mu$m is fetched at 0.5 second/screen, in data fetch of 100 pixels/line concerning the X axis and 100 lines (10,000 pixels/screen) concerning the Y axis. A value of the image fetching speed 0.5 second/screen is a quite short period of time in the scanning probe microscope. It is to be noted that a cantilever made of silicon nitride having a resonance frequency in a liquid of 395 kHz, a length of 9 $\mu$m, a width of 2 $\mu$m and a thickness of 0.09 $\mu$m was used.

Additionally, since a commercially available actuator can be used as the actuator 206 without any modifications, the scanning unit of this embodiment is advantageous in that the total cost can be reduced.

Second Embodiment

Figure 3B:
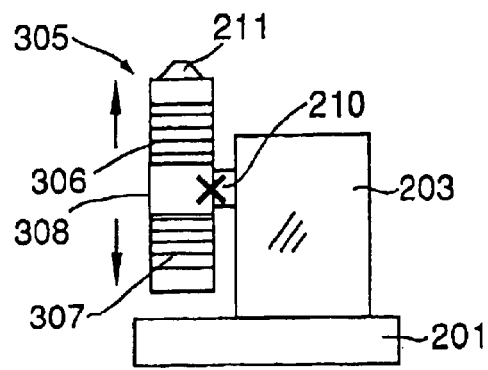
FIG. 3B is a drawing for explaining the operation of a scanning unit of a second embodiment according to the present invention.

A second embodiment according to the present invention will now be described with reference to FIG. 3B. FIG. 3B is a view corresponding to FIG. 3A and shows only members necessary for the following explanation. Further, in these drawings, like reference numerals denote like or corresponding parts.

In the scanning unit of this embodiment, the Z scanning actuator 305 has an actuator connection portion 308 consisting of, e.g., an aluminium block, and two stacked piezoelectric devices 306 and 307 connected to this actuator connection portion 308. In general, the two stacked piezoelectric devices 306 and 307 are widely commercially available, and they are fixed to the actuator connection portion 308 by an adhesive so that they can linearly extend with the actuator connection portion 308 therebetween. Furthermore, a sample holding portion 211 is attached to a free end of the stacked piezoelectric device 306.

As can be understood from the similarity with FIG. 3A, since the scanning unit of this embodiment also has the actuator 305 being held at a position in the vicinity of the center in dimension or of the center of gravity thereof, the scanning unit can stably operate with respect to high speed scanning with less vibrations.

Moreover, in the scanning unit of this embodiment, the actuator connection portion 308 sandwiched between the two stacked piezoelectric devices 306 and 307 is held by the actuator holding portion 210 composed of, for example, silicone rubber. Therefore, the scanning unit of this embodiment has an advantage that a difference in performance of the scanning unit hardly noticeable with respect to a quantity of silicone rubber used for attaching the actuator 305.

Third Embodiment

Figure 4A:
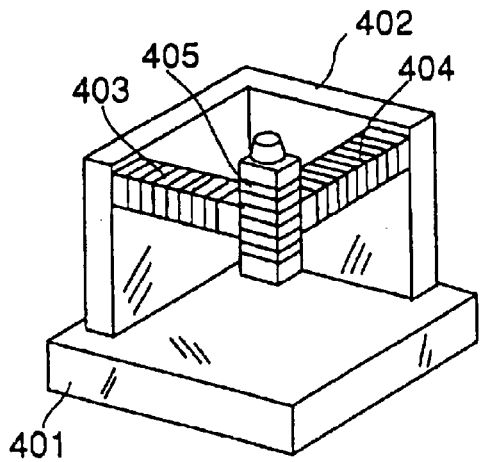
FIG. 4A is a perspective view of a scanning unit of a third embodiment according to the present invention, which shows the scanning unit upside down for easy understanding.
Figure 4B:
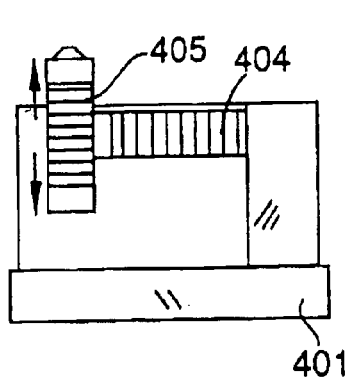
FIG. 4B is a side view of the scanning unit shown from the X direction.

A third embodiment according to the present invention will now be described with reference to FIGS. 4A and 4B. As shown in FIGS. 4A and 4B, the scanning unit of this embodiment comprises: a scanning unit holding base 401; an L-shaped actuator pedestal 402 fixed to the scanning unit holding base 402; two actuators 403 and 404 attached to the actuator pedestal 402; and an actuator 405 supported by the two actuators 403 and 404.

Each of the actuators 403, 404 and 405 comprises, for example, a stacked piezoelectric device and extendable along the X axis, the Y axis and the Z axis, respectively. Each of the X scanning actuator 403 and the Y scanning actuator 404 has one end portion being fixed to the actuator pedestal 402. The highest scanning speed is demanded from the Z scanning actuator 405, and its part close to the center in dimension or the center of gravity is fixed and held to the other end portion of each of the X scanning actuator 403 and the Y scanning actuator 404 by an adhesive.

The Z scanning actuator from which the highest scanning speed is demanded, i.e., the stacked piezoelectric device 405 has both side portions symmetrically extending and contracting in the opposed directions, as indicated by the arrows, with its part close to the center fixed to the X scanning actuator 403 and the Y scanning actuator 404 as a reference. The impact generated due to the extending and contracting operation of the stacked piezoelectric device 405 can be, therefore, suppressed. Accordingly, the scanning unit of this embodiment can stably operate with respect to high speed scanning with less vibrations.

In addition, the scanning unit of this embodiment has the following advantages as compared with the scanning unit of the first embodiment. In the scanning unit of the first embodiment, the X scanning and Y scanning actuators are pressed against the Z scanning actuator through the minute balls. Therefore, pressurization becomes insufficient during extended use, and scanning along the X axis and the Y axis becomes unstable. On the contrary, in the scanning unit of this embodiment, since the Z scanning actuator 405 is fixed to the X scanning and Y scanning actuators 403 and 404 by the adhesive, scanning along the X axis and the Y axis hardly becomes unstable.

Fourth Embodiment

Figure 5A:
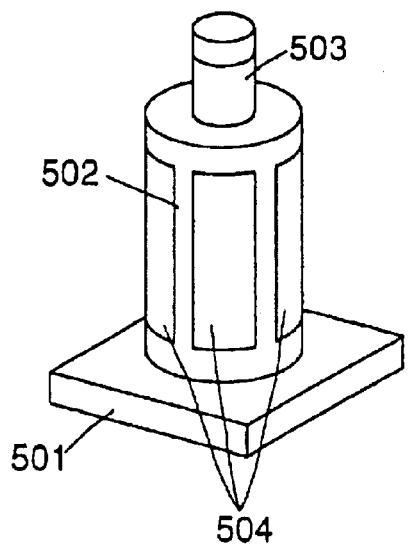
FIG. 5A is a perspective view of a scanning unit of a fourth embodiment according to the present invention, which shows the scanning unit upside down for easy understanding.
Figure 5B:
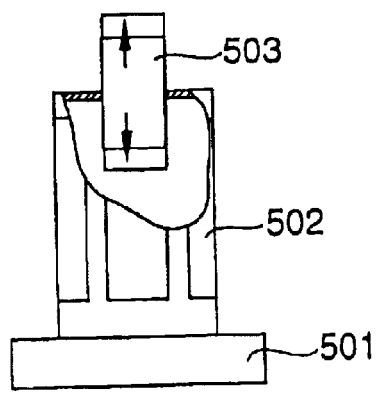
FIG. 5B is a partial cross-sectional side elevation of the scanning unit.

A fourth embodiment according to the present invention will now be described with reference to FIGS. 5A and 5B. The scanning unit of this embodiment comprises, as shown in FIGS. 5A and 5B, a scanning unit holding base 501, a cylindrical actuator 502 fixed to the scanning unit holding base 501, and another cylindrical actuator 503 supported by a free end of the actuator 502.

The cylindrical actuator 502 comprises, for example, a cylindrical piezoelectric device, and such a cylindrical piezoelectric device is often used in a commercially available scanning probe microscope. The cylindrical piezoelectric device 502 has four split electrodes 504 provided on an outer peripheral surface of a cylindrical piezoelectric material and an opposed electrode provided on an inner peripheral surface. The free end of the cylindrical piezoelectric device 502 can be scanned along the X axis and the Y axis by appropriately applying a voltage between these electrodes.

The cylindrical actuator 503 comprises also, for example, a cylindrical piezoelectric device, and this is smaller than the cylindrical piezoelectric device 502 and has a higher resonance frequency than that of the cylindrical piezoelectric device 502. The cylindrical piezoelectric device 503 has one electrode provided on an outer peripheral surface of a cylindrical piezoelectric material and one electrode provided on an inner peripheral surface. The free end of the cylindrical piezoelectric device 503 can be scanned along the Z axis by appropriately applying a voltage between both electrodes.

The cylindrical piezoelectric device 503 is held at a position in the vicinity of the center in dimension or of the center of gravity thereof by a member provided at the free end of the cylindrical piezoelectric device 502. Therefore, both side portions of the cylindrical piezoelectric device 503 symmetrically extend and contract in opposed directions, in accordance with application of a voltage between the electrodes, as indicated by the arrow, with its part close to the center fixed to the cylindrical piezoelectric device 502 as a reference. It is, therefore, possible to suppress the impact generated due to the extending and contracting operation of the cylindrical piezoelectric device 503 responsible for high speed scanning along the Z axis. The scanning unit of this embodiment can, thus, stably operate with respect to high speed scanning with less vibrations.

Fifth Embodiment

Figure 6A:
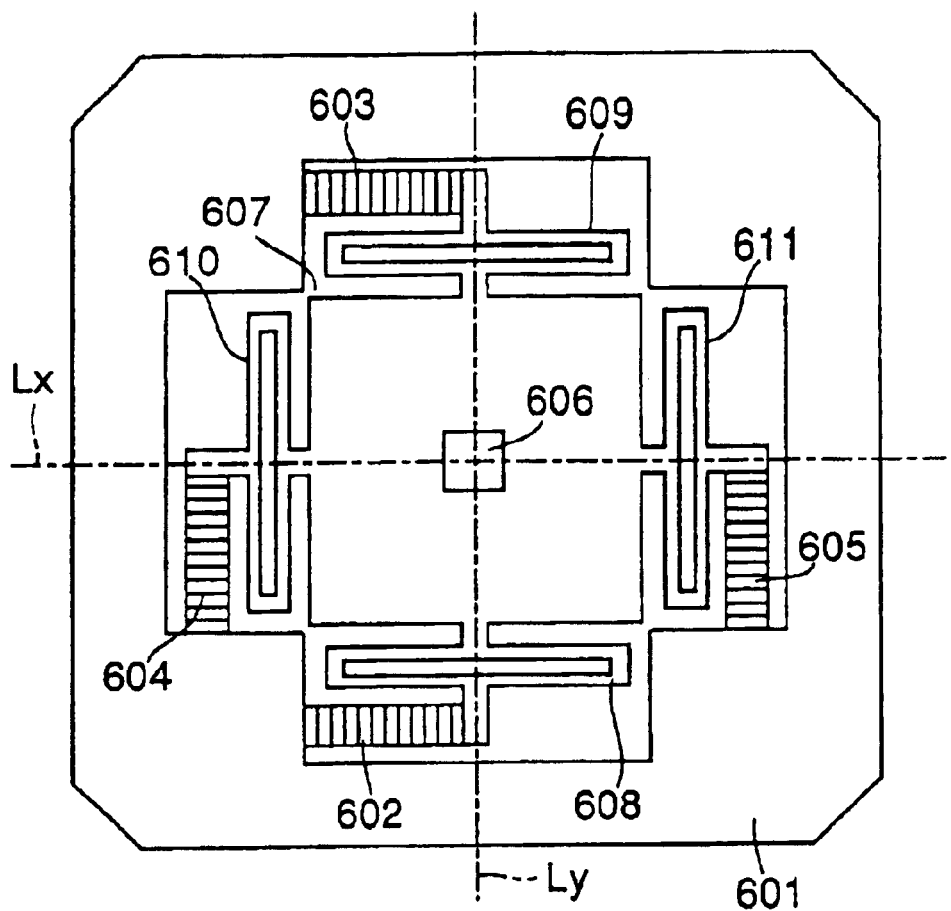
FIG. 6A is a plane view of a scanning unit of a fifth embodiment according to the present invention.
Figure 6B:
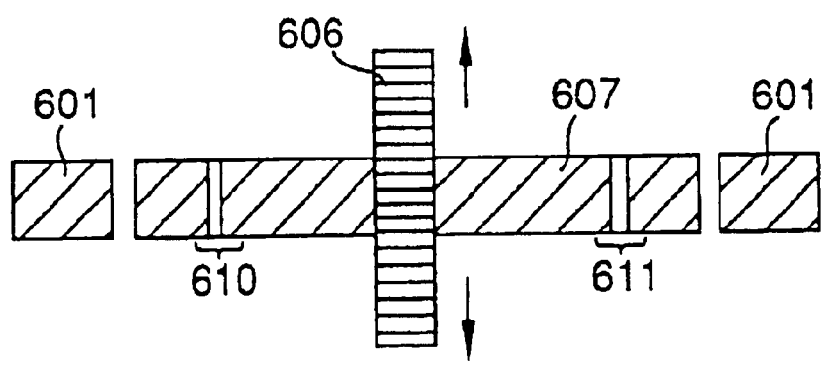
FIG. 6B is a cross-sectional view of the scanning unit taken along the line Lx.

A fifth embodiment according to the present invention will now be described with reference to FIGS. 6A and 6B. As shown in FIGS. 6A and 6B, the scanning unit of this embodiment comprises an XY stage having a parallel spring stage structure for XY scanning and an actuator 606 which is attached to the XY stage for Z scanning. The XY stage having the parallel spring stage structure is disclosed in Jpn. Pat. Appln. KOKAI Publication No. 126110/1999, and its content is incorporated in the present specification for reference.

The XY stage has a fixed table 601 and a movable table 607, and further includes a pair of elastic members 608 and 609 provided on both sides of the movable table 607 along the Y axis, a pair of elastic members 610 and 611 provided on both sides of the movable table 607 along the X axis, a pair of X direction actuators 602 and 603 for generating displacement for moving the movable table 607 along the X axis, and a pair of Y direction actuators 604 and 605 for generating displacement for moving the movable table 607 along the Y axis.

Each of the elastic members 608 and 609 comprises, for example, a rectangular spring which has a slit extending along the X axis and is elongated along the X axis. Further, each elastic member has relatively high rigidity along the X axis and, on the other hand, relatively low rigidity along the Y axis. Each of the elastic members 610 and 611 comprises, for example, a rectangular spring which has a slit extending along the Y axis and is elongated along the Y axis. Each of these elastic members has relatively high rigidity along the Y axis and, on the other hand, relatively low rigidity along the X axis.

The elastic members 608 and 609, therefore, restrict movement of the movable table 607 along the X axis without largely limiting movement of the same along the Y axis. On the other hand, the elastic members 610 and 611 restrict movement of the movable table 607 along the Y axis without largely limiting movement of the same along the X axis.

Additionally, the elastic members 608 and 609, the X direction actuators 602 and 603, the elastic members 610 and 611, and the Y direction actuators 604 and 605 cooperate with each other to support the movable table 607 so as to be maintained on the same plane. That is, they restrict movement of the movable table 607 along the Z axis. In other words, the elastic members 608 and 609, the X direction actuators 602 and 603, the elastic members 610 and 611, and the Y direction actuators 604 and 605 constitute a guide mechanism for restricting movement of the movable table 607 along the Z axis.

The actuator 606 in charge of Z scanning to which high speed scanning is required comprises, for example, a stacked piezoelectric device, and this stacked piezoelectric device has a part in the vicinity of the center thereof being fixed to the movable table 607 by, e.g., an adhesive. Both side portions of the Z scanning stacked piezoelectric device 606 symmetrically extend and contract in the opposed directions in response to application of a voltage, as indicated by the arrows, with its part close to the center thereof fixed to the movable table 607 as a reference. The impact generated by the extending and contracting operation of the stacked piezoelectric device 606 can be, therefore, suppressed. Accordingly, the scanning unit of this embodiment can stably operate with respect to high speed scanning with less vibrations.

A description will now be given as to comparative examples facilitating understanding of advantages of the scanning unit according to the present invention hereinafter.

FIRST COMPARATIVE EXAMPLE

Figure 7A:
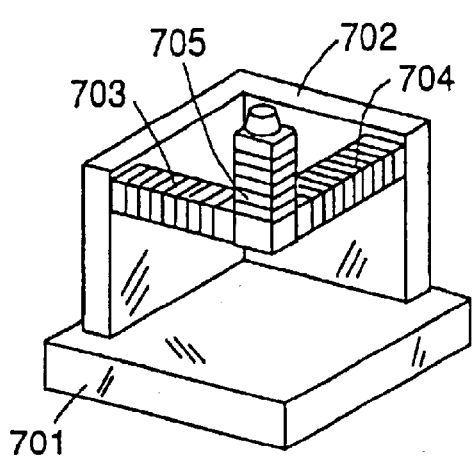
FIG. 7A is a perspective view of a scanning unit of a comparative example 1 according to a prior art for facilitating understanding the scanning unit according to the present invention.
Figure 7B:
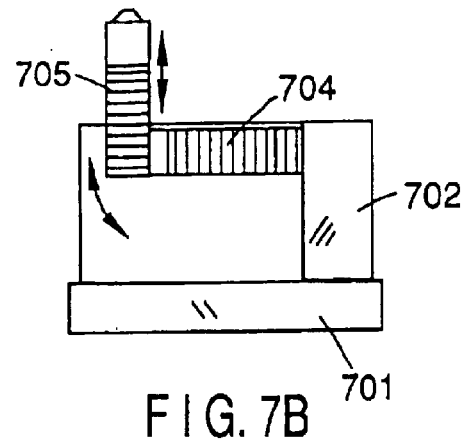
FIG. 7B is a partial cross-sectional side elevation of the scanning unit.

A first comparative example will be explained with reference to FIGS. 7A and 7B. As shown in FIGS. 7A and 7B, the scanning unit of this comparative example comprises a scanning unit holding base 701, an L-shaped actuator pedestal 702 fixed to the scanning unit holding base 701, two actuators 703 and 704 attached to the actuator pedestal 702, and an actuator 705 held by the two actuators 703 and 704.

Each of the actuators 703, 704 and 705 comprises, for example, a stacked piezoelectric device and extendable along the X axis, the Y axis and the Z axis. Each of the X scanning stacked piezoelectric device 703 and the Y scanning stacked piezoelectric device 704 has one end portion fixed to the actuator pedestal 702. One end of the Z scanning stacked piezoelectric device 705 is fixed to the other end of each of the X scanning stacked piezoelectric device 703 and the Y scanning stacked piezoelectric device 704 by an adhesive in order to obtain a long stroke, namely, a scanning range.

In this scanning unit, the extending and contracting operation of the Z scanning stacked piezoelectric device 705 generates the moment in the X scanning and Y scanning stacked piezoelectric devices 703 and 704. This produces the vibrations, and the generated vibrations are transmitted to the actuator pedestal 702 or the scanning unit holding base 701 to oscillate the scanning unit.

The scanning unit of each of the foregoing embodiments has reduced vibration noise as compared with the scanning unit of this comparative example.

SECOND COMPARATIVE EXAMPLE

Figure 8A:
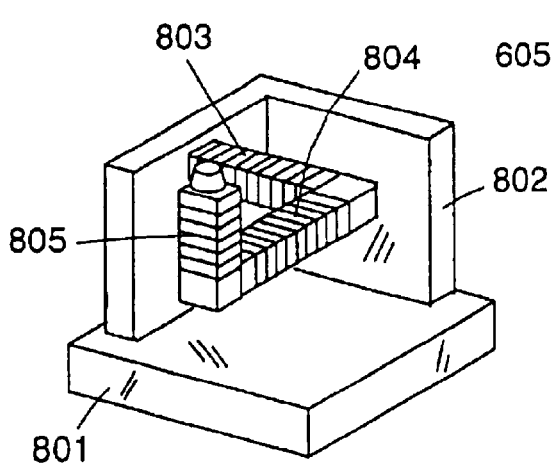
FIG. 8A is a perspective view of a scanning unit of a comparative example 2 according to the prior art for facilitating understanding the scanning unit according to the present invention.
Figure 8B:
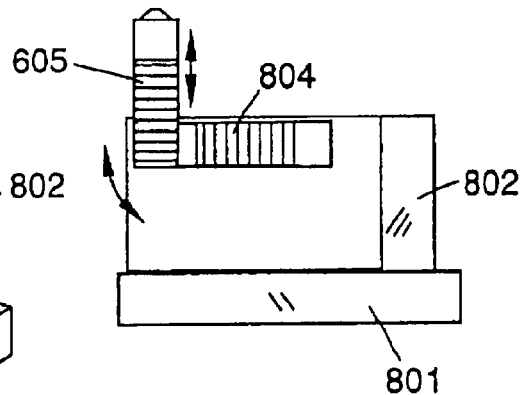
FIG. 8B is a partial cross-sectional side elevation of the scanning unit.

A second comparative example will now be described with reference to FIGS. 8A and 8B. As shown in FIGS. 8A and 8B, the scanning unit of this comparative example comprises a scanning unit holding base 801, an L-shaped actuator pedestal 802 fixed to the scanning unit holding base 801, an X scanning actuator 803 fixed to the actuator pedestal 802, a Y scanning actuator 804 fixed to a free end portion of the X scanning actuator 803, and a Z scanning actuator 805 fixed to a free end portion of the Y scanning actuator 804.

Each of the actuators 803, 804 and 805 comprises, for example, a stacked piezoelectric device, and these actuators are connected to each other in series with their directions changed at 90 degrees in order to obtain a long stroke, i.e., a scanning range.

In this scanning unit, the extending and contracting operation of the Z scanning stacked piezoelectric device 805 generates the moment to the X scanning stacked piezoelectric device 804 or the X scanning stacked piezoelectric device 803, as similar to the first comparative example. This produces the vibrations, and the generated vibrations are transmitted to the actuator pedestal 802 or the scanning unit holding base 801, thereby oscillating the scanning unit.

The scanning unit of each of the foregoing embodiments has reduced vibration noise as compared with the scanning unit of this comparative example.

THIRD COMPARATIVE EXAMPLE

Figure 9A:
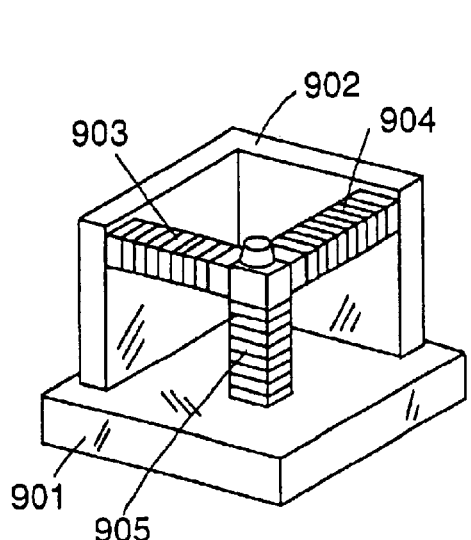
FIG. 9A is a perspective view of a scanning unit of a comparative example 3 according to the prior art for facilitating understanding the scanning unit according to the present invention.
Figure 9B:
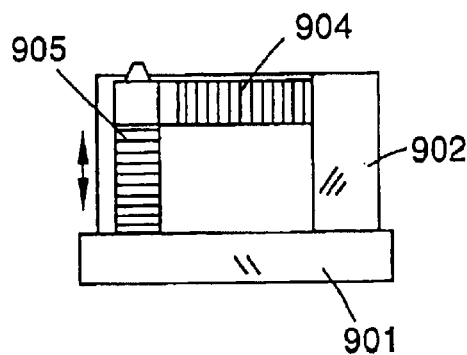
FIG. 9B is a partial cross-sectional side elevation of the scanning unit.

A third comparative example will now be described with reference to FIGS. 9A and 9B. As shown in FIGS. 9A and 9B, the scanning unit of this comparative example comprises a scanning unit holding base 901, an L-shaped actuator pedestal 902 fixed to the scanning unit holding base 901, an X scanning actuator 903, a Y scanning actuator 904, and a Z scanning actuator 905. Each of the actuators 903, 904 and 905 comprises, for example, a stacked piezoelectric device and extendable along the X axis, the Y axis and the Z axis.

One end portion of each of the X scanning actuator 903 and the Y scanning actuator 904 is fixed to the actuator pedestal 902, and one end portion of the Z scanning actuator 905 is fixed to the scanning unit holding base 901. The other end portions of the three stacked piezoelectric devices 903, 904 and 905 are connected to each other. That is, the scanning unit of this comparative example is of a so-called tripod type which is the most common structure as the scanning unit of the scanning tunnel microscope.

In this scanning unit, the counteraction of the extending and contracting operation of the Z scanning piezoelectric device 905 is directly transmitted to the scanning unit holding base 901 to oscillate the scanning unit or twist the X scanning and Y scanning stacked piezoelectric devices 903 and 904 out of shape. Further, the vibration of that operation is transmitted to the actuator pedestal 902 to oscillate the scanning unit.

The scanning unit of each of the foregoing embodiments has reduced vibration noise as compared with the scanning unit of this comparative example.

Sixth Embodiment

Figures 10A, 10B, 10C:
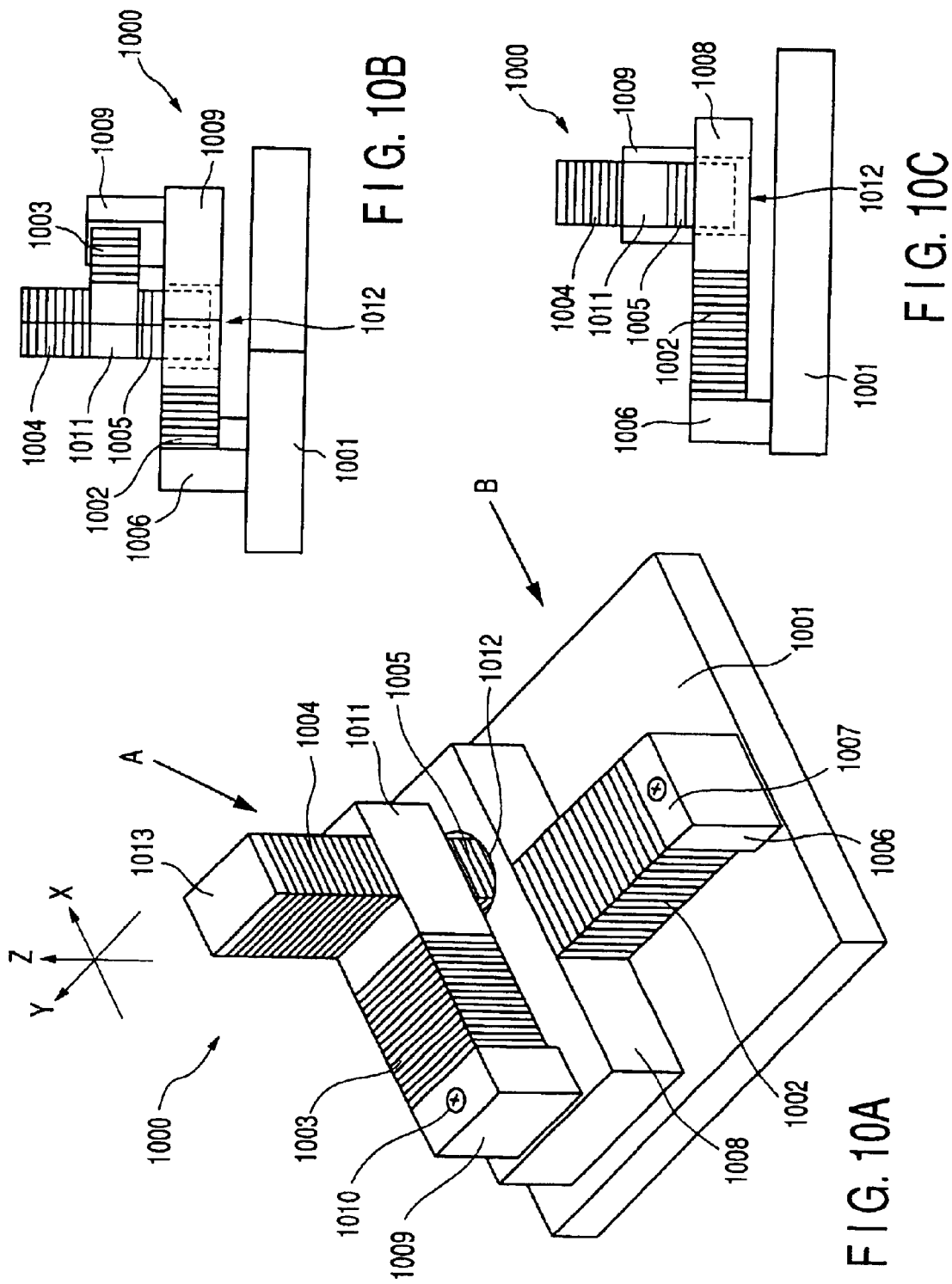
FIG. 10A is a perspective view of a scanning unit of a sixth embodiment according to the present invention.
FIG. 10B is a view of the scanning unit shown from the direction of arrow A.
FIG. 10C is a view of the scanning unit shown from the direction of arrow B.

A sixth embodiment according to the present invention will now be described with reference to FIGS. 10A to 10C. FIG. 10A is a perspective view of a scanning unit of this embodiment; FIG. 10B, a view showing FIG. 10A from the direction of arrow A; and FIG. 10C, a view showing FIG. 10A from the direction of arrow B.

The scanning unit of this embodiment comprises a scanning unit holding base 1001 as a base plate, a first actuator holding portion 1006 fixed to the scanning unit holding base 1001, a Y scanning actuator 1002 which is attached to the actuator holding portion 1006 and extendable along the Y axis, a block 1008 attached to the other end of the Y scanning actuator 1002, a second actuator holding portion 1009 fixed to the block 1008, an X scanning actuator 1003 which is attached to the actuator holding portion and extendable along the X axis, an actuator connection portion 1011 attached to the other end of the X scanning actuator 1003, and two actuators 1004 and 1005 which are fixed to the actuator connection portion 1011 and extendable along the Z axis.

The two actuators 1004 and 1005 and the actuator connection portion 1011 constitute the Z scanning actuator. To a free end side 1013 of the actuator 1004 constituting the Z scanning actuator is attached a sample holding portion (similar to the sample holding portion 211 shown in FIGS. 2A to 2D) according to needs. The first actuator holding portion 1006 is fixed to the scanning unit holding base 1001 by a screw 1007, and the second actuator holding portion 1009 is fixed to a block 1008 by a screw 1010.

Each of the actuators 1002, 1003, 1004 and 1005 comprises, for example, a stacked piezoelectric device, and has a length of 5 mm and a cross section of 2 mm×3 mm. These actuators extend and contract upon application of a voltage of 100 V. Cylindrical piezoelectric devices may be used for these actuators instead of the stacked piezoelectric devices.

As can be understood from FIG. 10B or 10C, the block 1008 is distanced from the scanning unit holding base 1001 and can move along the Y axis in response to drive of the Y scanning actuator 1002. Further, as can be understood from FIG. 10B, the actuator connection portion 1011 does not come into contact with the block 1008 and can move along the X axis in response to drive of the X scanning actuator 1003.

In order to suppress transmission of the vibration generated from high speed scanning along the Z axis at a scanning frequency, namely, Z scanning to the X scanning actuator 1003 and the like, the two actuators 1004 and 1005 constituting the Z scanning actuator are driven in synchronization with each other in the opposed directions with the actuator connection portion 1011 at the center.

The actuator 1005 under the Z scanning actuator extends in a through hole (clearance hole) 1012 formed to the block 1008 without being brought into contact with the block 1008.

In a similar fashion to that of the second embodiment described with reference to FIG. 3B, since the two actuators 1004 and 1005 constituting the Z scanning actuator in the scanning unit of this embodiment symmetrically extend and contract in opposed directions along the Z axis, the impact generated by high speed Z scanning is balanced. Therefore, less vibrations are generated in the actuator connection portion 1011 connecting the two actuators 1004 and 1005. Thus, the X scanning actuator 1003 holding the actuator connection portion 1011 or the Y scanning actuator 1002 holding the X scanning actuator 1003 are subjected to less vibrations. As a result, this scanning unit can stably operate with respect to high speed scanning.

Moreover, the scanning unit 1000 of this embodiment comprises a structure obtained by folding the X scanning actuator from the left end of the block 1008 to the right side. The center of gravity of a part mounted on the block 1008 (including the X scanning actuator 1003, for example) is positioned in the vicinity of the center axis of the Y scanning actuator (a line parallel to the extending and contracting direction and running through the center of the cross section of the actuator). Thus, yawing hardly occurs with respect to Y scanning. This point also contributes to an improvement of the stability at the time of high speed scanning.

Seventh Embodiment

A seventh embodiment according to the present invention will now be described with reference to FIG. 11. The basic structure of the scanning unit of this embodiment is similar to the scanning unit 1000 of the sixth embodiment described with reference to FIGS. 10A to 10C.

The scanning unit 1100 of this embodiment comprises a scanning unit holding base 1101 as a base plate, a first actuator holding portion 1106 fixed to the scanning unit holding base 1101, a Y scanning actuator 1102 which is attached to the actuator holding portion 1106 and extendable along the Y axis, a block 1108 attached to the other end of the Y scanning actuator 1102, a second actuator holding portion 1109 fixed to the block 1108, an X scanning actuator 1103 which is attached to the actuator holding portion 1109 and extendable along the X axis, an actuator connection portion 1111 attached to the other end of the X scanning actuator 1103, and two actuators 1104 and 1105 which are fixed to the actuator connection portion 1111 and extendable along the Z axis.

The two actuators 1104 and 1105 and the actuator connection portion 1111 constitute the Z scanning actuator. A sample holding portion (similar to the sample holding portion 211 shown in FIGS. 2A to 2D) is attached to a free end side 1121 of the actuator 1104 constituting the Z scanning actuator according to needs. The actuator holding portion 1006 is fixed to the scanning unit holding base 1001 by a screw 1007.

The block 1108 is supported by elastic hinge mechanisms 1117 and 1118 and block holding portions 1113 and 1114. The block holding portions 1113 and 1114 are fixed to the scanning unit holding base 1101 by screws 1115 and 1116. Each of the elastic hinge mechanisms 1117 and 1118 is a mechanism having a spring property formed by alternately arranging a through hole 1120 and a notched groove 1119 connected to this hole, and restricts movement of the block 1108 along the X axis and the Z axis without largely limiting movement of the same along the Y axis. In other words, the elastic hinge mechanisms 1117 and 1118 constitute a guide mechanism restricting movement of the block 1108 along the Z axis, and this guide mechanism suppresses generation of deflection of the Y scanning actuator 1102 along the Z axis.

In the scanning unit 1000 of the sixth embodiment illustrated in FIGS. 10A to 10C, the sample holding portion is attached to an end portion 1013 of the Z scanning actuator 1004 according to needs, and a sample is detachably fixed to the sample holding portion. When replacing the sample, force pressing the sample in the −Z direction to fix the sample is applied to the sample holding portion. Since the X scanning actuator 1003 and the Y scanning actuator 1002 are substantially cantilevered, they may be possibly bent when the stress caused due to the moment of the force applied to the sample holding portion acts when replacing the sample. In particular, the joint portion of the Y scanning actuator 1002 and the actuator holding portion 1006 can be easily bent. Therefore, sample replacement must be carefully carried out.

Figure 11:
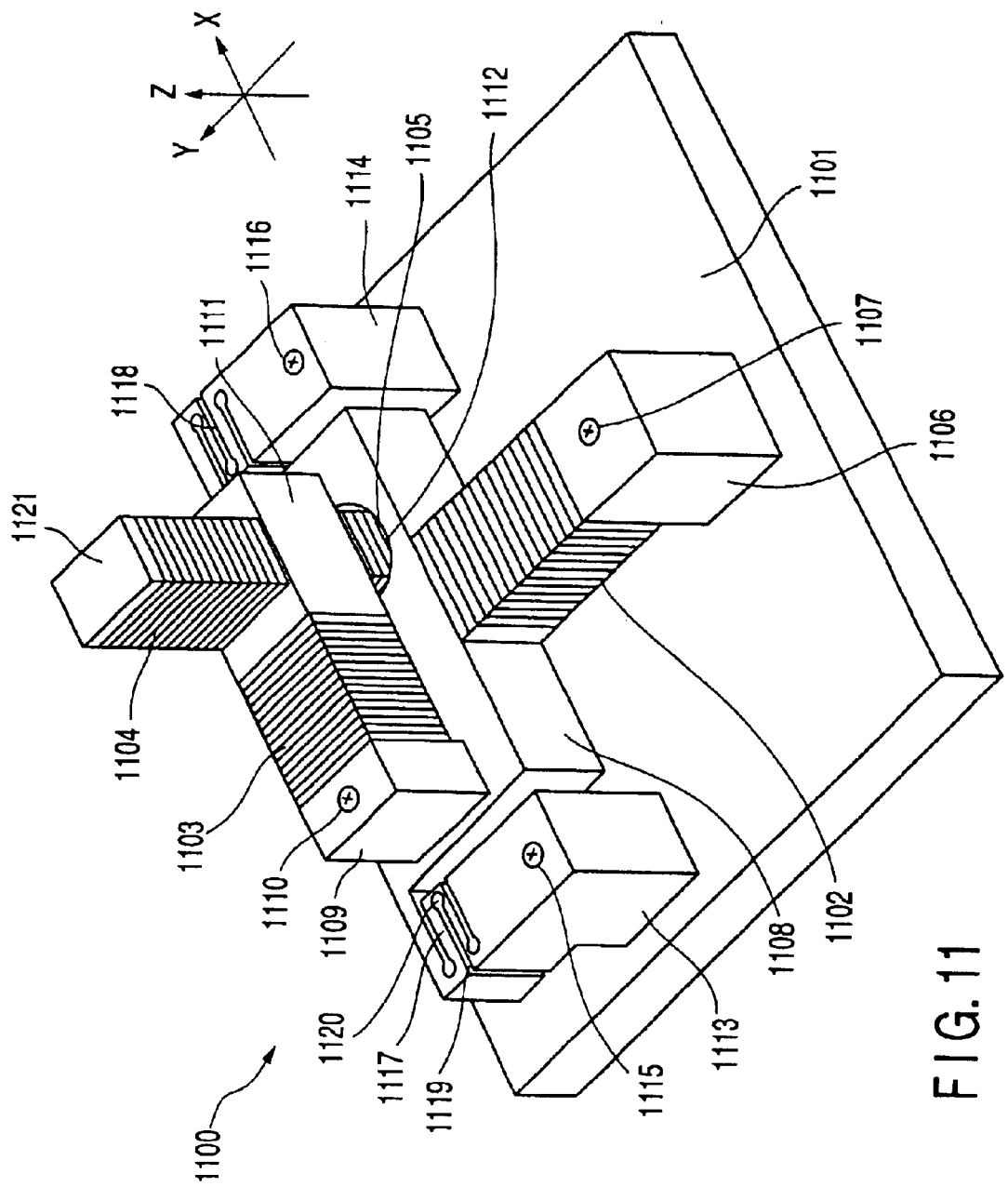
FIG. 11 is a view for explaining the operation of a scanning unit of a seventh embodiment according to the present invention.

On the contrary, in the scanning unit 1100 of this embodiment shown in FIG. 11, the Y scanning actuator 1102 is supported in the center impeller manner by the block 1108 and the actuator holding portion 1107. As a result, the joint portion of the Y scanning actuator 1102 and the actuator holding portion 1106 which is apt to be bent in the scanning unit 1000 of the sixth embodiment is hardly bent. The center impeller support prevents the Y scanning actuator 1102 from being deflected in the gravitational force direction (−Z direction) by the weight of the unit provided thereon and avoids collapse of the orthogonality of the XYZ scanning by deflection.

In light of these viewpoints, it can be considered that the Y scanning unit of this embodiment has a guide mechanism using an elastic hinge mechanism. Alternatively, considering the extension of a folded hinge mechanism, it can be also considered that the Y scanning unit has a guide mechanism using a leaf spring mechanism. Further, it can be said that the guide mechanism constitutes a mechanism for reducing deflection and vibrations of the actuator.

In a similar to that of the foregoing embodiments, since the two actuators 1104 and 1105 constituting the Z scanning actuator in the scanning unit of this embodiment symmetrically extend and contract along the Z axis, the impact generated by high speed Z scanning can be balanced. Thus, the scanning unit can stably operate with respect to high speed scanning with less vibrations generated from the scanning operation.

In this embodiment, although the guide mechanism, i.e., the elastic hinge is provided to the movable end side of the Y scanning actuator 1102, the guide mechanism may be provided to the movable end side of the X scanning actuator 1103 so that deflection of the X scanning actuator 1103 in the gravitational force direction can be prevented and the vibrations can be reduced.

Eighth Embodiment

Figure 12A:
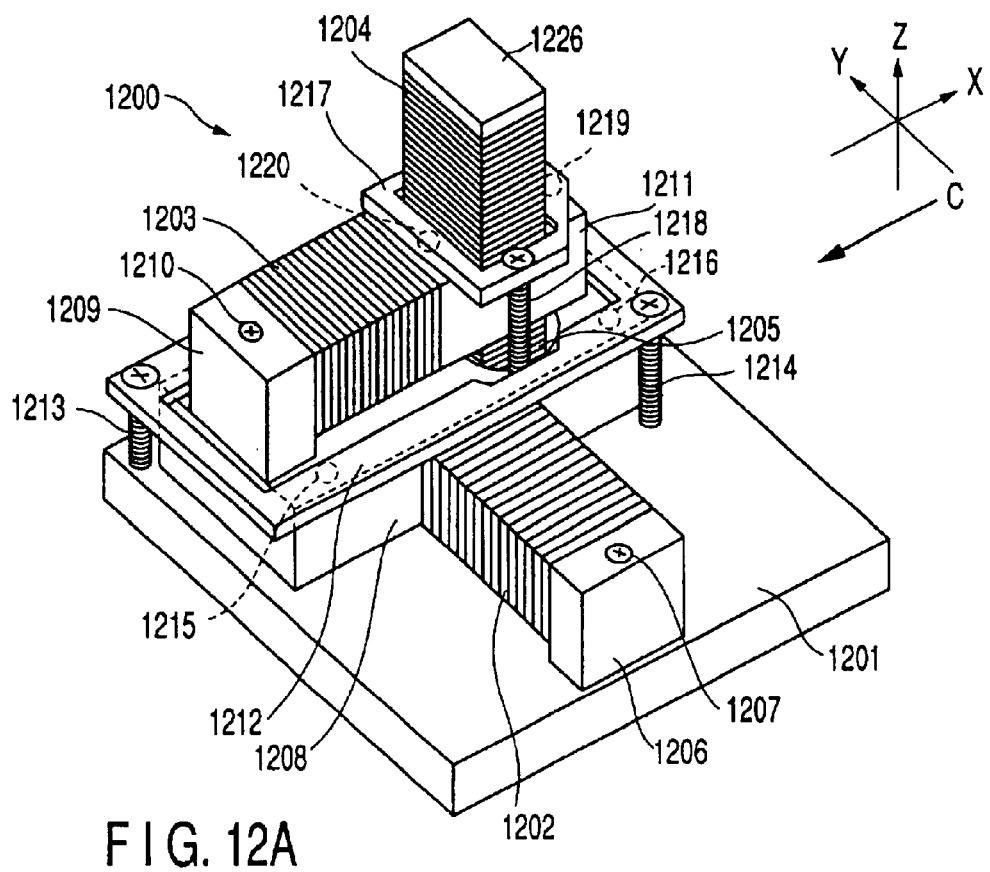
FIG. 12A is a perspective view of a scanning unit of an eighth embodiment according to the present invention.

An eighth embodiment according to the present invention will now be described with reference to FIGS. 12A and 12B. FIG. 12A is a perspective view showing a scanning unit of this embodiment, and FIG. 12B is a side view of FIG. 12A shown from the direction of arrow C.

The scanning unit 1200 of this embodiment comprises a scanning unit holding base 1201 as a base plate, a first actuator holding portion 1206 fixed to the scanning unit holding base 1201, a Y scanning actuator 1202 which is attached to the actuator holding portion 1206 and extendable along the Y axis, a block 1208 attached to the other end of the Y scanning actuator 1202, a second actuator holding portion 1209 fixed to the block 1208, an X scanning actuator 1203 which is attached to the actuator holding portion 1209 and extendable along the X axis, an actuator connection portion 1211 attached to the other end of the X scanning actuator 1203, and two actuators 1204 and 1205 which are fixed to the actuator connection portion 1211 and extendable along the Z axis.

The two actuators 1204 and 1205 and the actuator connection portion 1211 constitute the Z scanning actuator. A sample holding portion (similar to the sample holding portion 211 shown in FIGS. 2A to 2D) is attached to a free end side 1226 of the actuator 1204 constituting the Z scanning actuator according to needs. The first actuator holding portion 1206 is fixed to the scanning unit holding base 1201 by a screw 1207, and the second actuator holding portion 1209 is fixed to the block 1208 by a screw 1210.

Figure 12B:
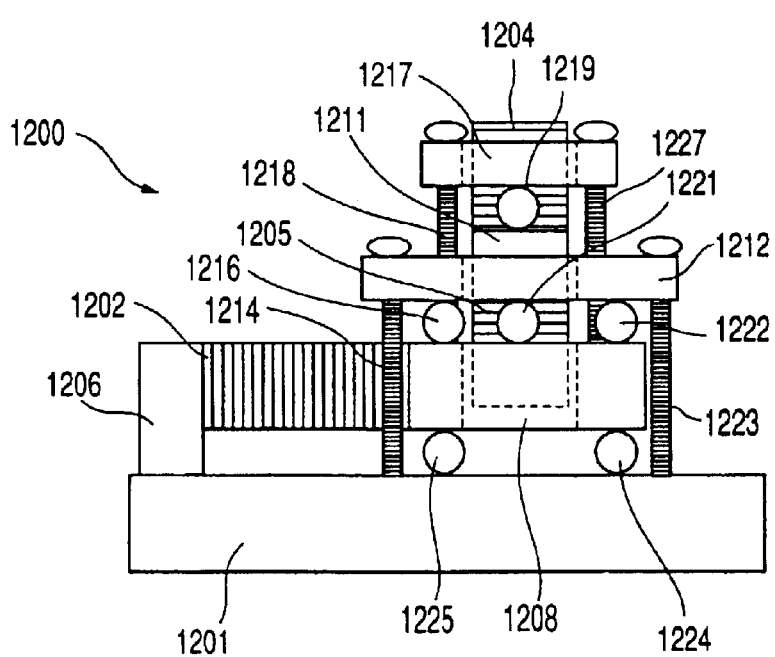
FIG. 12B is a view of the scanning unit shown from the direction of arrow C.

As shown in FIG. 12B, the block 1208 which is moved along the Y axis in accordance with drive by the Y scanning actuator 1202 is positioned between the scanning unit holding base 1201 and a first pressing plate 1212 and sandwiched by minute balls 1216, 1222, 1224, 1225 and 1215 (see FIG. 12A). A gap between the scanning unit holding base 1201 and the pressing plate 1212 is adjusted by screws 1213 and 1214 so that they can be fixed in parallel with each other. As a result, the block 1208 is not largely restricted in connection with movement along the Y axis, but its movement along the Z axis is limited.

In other words, the scanning unit of this embodiment has a minute ball rolling or sliding guide which restricts movement of the block 1208 along the Z axis, and this guide has a scanning unit holding base 1201 positioned under the block 1208, minute balls 1224 and 1225 positioned between the block 1208 and the scanning unit holding base 1201, a pressing plate 1212 positioned above the block 1208, minute balls 1215, 1216 and 1222 positioned between the block 1208 and the pressing plate 1212, and screws 1213 and 1214 which cause the pressing plate 1212 and the block 1208 to sandwich and the minute balls 1215, 1216, 1222, 1224 and 1225 therebetween and presses the pressing plate 1212 and the block 1208 against the scanning unit holding base 1201.

An actuator connection portion 1211 which is moved along the X axis in accordance with drive by the X scanning actuator 1203 is positioned between the block 1208 and a second pressing plate 1217 and supported by the minute poles 1219 and 1220 from the upper portion and by the minute ball 1221 from the lower portion so that its movement along the Z axis is restricted. A gap between the block 1208 and the pressing plate 1217 is adjusted by the screws 1218 and 1227 so that they can be fixed in parallel with each other. Consequently, the actuator connection portion 1211 is not largely restricted in regard to movement along the X axis, but its movement along the Z axis is limited.

In other words, the scanning unit of this embodiment has a minute ball rolling or sliding guide which restricts movement of the actuator connection portion 1211 along the Z axis, and this guide has a block 1208 positioned below the actuator connection portion 1211, a minute ball 1221 positioned between the actuator connection portion 1211 and the block 1208, a pressing plate 1217 positioned above the actuator connection portion 1211, a minute ball 1219 positioned between the actuator connection portion 1211 and the pressing plate 1217, and screws 1218 and 1227 for pressing the pressing plate 1217 and the actuator connection portion 1211 against the block 1208 with the minute balls 1219 and 12121 between the pressing plate 1217 and the actuator connection portion 1211.

As described above, in the scanning unit 1200 of this embodiment, deflection and vibrations of the Y scanning actuator 1202 are suppressed by a minute ball rolling or sliding guide including the pressing plate 1212, the screws 1213 and 1214, and the minute balls 1216, 1215, 1222, 1224 and 1225, and deflection and vibrations of the X scanning actuator 1203 are suppressed by the minute ball rolling or sliding guide including the pressing plate 1217, the screws 1218 and 1227 and the minute balls 1219 and 1220.

U.S. Pat. No. 5,912,461 discloses a probe scanning unit of a scanning probe microscope having a minute ball rolling or sliding guide. In this scanning unit, a minute ball is arranged between a moving body which is a member to be scanned and an end surface of a movable end of each actuator, and displacement of the actuator is indirectly transmitted to the moving body through the minute ball. Furthermore, the moving body and each actuator are attracted to each other with the minute ball therebetween by a magnet or a spring.

On the contrary, in the scanning unit 1200 of this embodiment, a member to be moved (for example, a block 1208) is directly connected to an actuator for driving this member (for example, a Y scanning actuator 1202), and a minute ball rolling or sliding guide guides the member to be moved in such a manner that scanning movement of this actuator is not restricted.

Although each of the scanning unit of this embodiment and the scanning unit of U.S. Pat. No. 5,912,461 has the minute ball rolling or sliding guide, the both scanning units are structurally different from each other in this regard. Since the scanning unit of this embodiment has a higher mechanical rigidity and performs direct drive, the vibrations can be reduced and scanning can be effected at a higher speed.

Moreover, the size of probe scanning unit of U.S. Pat. No. 5,912,461 tends to be large since a mechanism for holding a moving body as a member to be scanned is included in a portion controlling scanning. Therefore, this scanning unit is not suitable for the high speed scanning application aimed at by the scanning unit according to the present invention. Additionally, in the structure using a magnet, the possibility that the moving body may unintentionally come off can not be denied, and the moving body must be carefully treated when used. Thus, this structure has a usability problem to a certain extent.

On the other hand, in the scanning unit of this embodiment, the block 1208 as a member to be scanned and the actuator connection portion 1211 have minute balls arranged on their side surfaces on both sides along the Z axis and are pressed from the outer side. That is, a mechanism for holding the member to be scanned is provided outside the portion in charge of scanning. It is, therefore, possible to minimize an increase in weight of the scanned portion, thus a possible reduction in scanning frequency, due to increased weight, is avoided, making this scanning unit suitable for high speed scanning. In addition, the member to be scanned is free from the worry of it detaching, and the scanning unit can be stably used.

Further, in the above-described embodiments, although the actuators which are the piezoelectric devices have been exemplified, the technical concept of suppressing the generation of vibration by holding the kinetic system of the drive portion at a position in the vicinity of the center of gravity thereof can be also applied to other actuators. For example, this can be applied to an actuator which is of a voice coil type, and similar advantages can be obtained by holding the kinetic system at a position in the vicinity of the center of gravity thereof.

Furthermore, the scanning unit according to the present invention has an advantage of enabling high speed operation while suppressing the vibration as well as an advantage of reducing the scanning noise, thereby decreasing undesirable drive sounds.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning microscope for using a probe to observe a surface of a sample, comprising:

a probe arranged in the vicinity of a surface of a sample;

a cantilever for supporting the probe;

a scanning unit for relatively scanning the probe and the sample; and a displacement detection system for detecting displacement of the cantilever based on the interaction of the probe and the sample, the scanning unit including:

a first actuator for moving an object to be moved which is either the probe or the sample along a first axis, the first actuator having a pair of end portions, the object being attached to one of the end portions, the first actuator being held at a position in the vicinity of the center in dimension or the center of gravity thereof;

a second actuator for moving the object along a second axis different from the first axis; and a third actuator for moving the object along a third axis different from both the first axis and the second axis, the second actuator and the third actuator comprising a common cylindrical piezoelectric actuator.

2. A scanning microscope for using a probe to observe a surface of a sample, comprising:

a probe arranged in the vicinity of a surface of a sample;

a cantilever for supporting the probe;

a scanning unit for relatively scanning the probe and the sample; and a displacement detection system for detecting displacement of the cantilever based on the interaction of the probe and the sample, the scanning unit including:

a first actuator for moving an object to be moved which is either the probe or the sample along a first axis, the first actuator having a pair of end portions, the object being attached to one of the end portions, the first actuator being held at a position in the vicinity of the center in dimension or the center of gravity thereof;

a movable member for holding the first actuator;

a second actuator for moving the movable member along a second axis different from the first axis;

a third actuator for moving the movable member along a third axis different from both the first axis and the second axis; and a guide mechanism for restricting movement of the movable member along the first axis.

3. A scanning microscope for using a probe to observe a surface of a sample, comprising:

a probe arranged in the vicinity of a surface of a sample;

a cantilever for supporting the probe;

a scanning unit for relatively scanning the probe and the sample; and a displacement detection system for detecting displacement of the cantilever based on the interaction of the probe and the sample, the scanning unit including:

a first actuator for moving an object to be moved which is either the probe or the sample along a first axis, the first actuator having a pair of end portions, the object being attached to one of the end portions, the first actuator being held at a position in the vicinity of the center in dimension or the center of gravity thereof;

a second actuator for moving the object along a second axis different from the first axis, the second actuator having a pair of end portions, one of the end portions being connected to the first actuator;

a movable member for supporting the second actuator;

a third actuator for moving the object along a third axis different from both the first axis and the second axis, the third actuator having a pair of end portions, one of the end portions being connected to a movable member to support the movable member, the other one of the end portions being fixed; and a guide mechanism for restricting movement of the movable member along the first axis.

* * * * *